United States Patent [19]
Piotrowski et al.

[11] Patent Number: 5,405,702
[45] Date of Patent: Apr. 11, 1995

[54] METHOD FOR MANUFACTURING A THIN-FILM EAS AND MARKER

[75] Inventors: Chester Piotrowski, White Bear Lake; Timothy M. Fell, Oakdale, both of Minn.

[73] Assignee: Minnesota Mining and Manufacturing Company, Saint Paul, Minn.

[21] Appl. No.: 175,790

[22] Filed: Dec. 30, 1993

[51] Int. Cl.⁶ .................................... H01F 10/02
[52] U.S. Cl. ...................... 428/458; 427/128,130; 427/131; 427/132; 427/255.7; 427/548; 427/599; 428/480; 428/900
[58] Field of Search ............ 427/599, 128–132, 427/255.7, 548; 428/694, 900, 458, 480

[56] References Cited

U.S. PATENT DOCUMENTS

| | | | |
|---|---|---|---|
| Re. 32,427 | 5/1987 | Gregor et al. | 340/572 |
| 3,665,449 | 5/1972 | Elder et al. | 340/280 |
| 3,747,086 | 7/1973 | Peterson | 340/280 |
| 3,765,007 | 10/1973 | Elder | 340/280 |
| 4,158,434 | 6/1979 | Peterson | 235/382 |
| 4,539,558 | 9/1985 | Fearon | 340/572 |
| 4,682,154 | 7/1987 | Fearon et al. | 340/572 |
| 4,689,590 | 8/1987 | Heltemes | 335/284 |
| 4,710,754 | 12/1987 | Montean | 340/572 |
| 4,745,401 | 5/1988 | Montean | 340/572 |
| 4,746,908 | 5/1988 | Montean | 340/551 |
| 4,825,197 | 4/1989 | Church et al. | 340/572 |
| 4,960,651 | 10/1990 | Pettigrew et al. | 428/607 |
| 4,967,185 | 10/1990 | Montean | 340/572 |
| 5,010,320 | 4/1991 | Cordery | 340/551 |
| 5,015,993 | 5/1991 | Strom-Olsen et al. | 340/551 |
| 5,083,112 | 1/1992 | Piotrowski et al. | 340/572 |

FOREIGN PATENT DOCUMENTS

| | | |
|---|---|---|
| 0295028 | 12/1988 | European Pat. Off. . |
| 0459722 | 5/1991 | European Pat. Off. . |
| 0448114 | 9/1991 | European Pat. Off. . |
| 763681 | 3/1934 | France . |
| WO90/07784 | 7/1990 | WIPO . |

*Primary Examiner*—Bernard Pianalto
*Attorney, Agent, or Firm*—Gary L. Griswold; Walter N. Kirn; Kari H. Bartingale

[57] ABSTRACT

A method for manufacturing a nonlinear, dual-axis thin-film magnetic device which can be used as an electronic article surveillance system marker. The method includes providing a substrate having a surface characterized by first and second generally perpendicular axes. A magnetic field oriented parallel to the first axis is applied on the surface of the substrate. A first stack of relatively thin thin-film magnetic layers separated by nonmagnetic thin-film layers is grown on the substrate. The relatively thin thin-tim layers are grown in the presence of the magnetic field to a thickness sufficiently thick that the layers exhibit magnetic properties that are substantially independent of surface effects, but sufficiently thin that the easy axis of magnetization is oriented parallel to the second axis. A second stack of relatively thick thin-film magnetic layers separated by nonmagnetic thin-film layers is grown on the first stack. The relatively thick thin-film layers are grown in the presence of the magnetic field to a thickness sufficiently thick that the easy axis of magnetization is oriented parallel to the first axis.

22 Claims, 5 Drawing Sheets

METHOD FOR MANUFACTURING A THIN-FILM EAS AND MARKER

BACKGROUND

The present invention relates generally to thin-film magnetic devices. In particular, the present invention is a method for manufacturing thin-film magnetic markers of the type used in electronic article surveillance systems.

Magnetic-type electronic article surveillance (EAS) systems are commonly used to prevent the theft or other unauthorized removal of articles such as books and clothing from libraries, bookstores and department stores. EAS systems of this type include markers which are affixed to the articles to be protected, and an interrogation system including detection panels positioned on opposite sides of a detection corridor leading to exits of the buildings in which the articles are located. The interrogation system produces an alternating magnetic interrogation signal at a predetermined frequency which is transmitted between the detection panels. The markers are relatively small members that include magnetic material. Unless effectively disabled, e.g., at a check-out counter, the magnetic material in the marker emits harmonics of the predetermined interrogation frequency when exposed to the interrogation signal. The interrogation system monitors the presence of these harmonics, and generates an alarm signal when the harmonics are detected. Markers of this type that can be reversibly deactivated are known as dual status markers. EAS systems of this type are described generally in the Elder et al. U.S. Pat. No. 3,665,449 and commercially available from Minnesota Mining and Manufacturing Company (3M).

Markers used in EAS systems of this type typically include elongated strips (e.g., 15.0 cm×0.6 cm) of amorphous or polycrystalline ferromagnetic materials exhibiting magnetic properties including those known as low coercivity and high permeability. The Piotrowski et al. U.S. Pat. No. 5,083,112 discloses a more compact marker which includes a plurality of thin-film layers of permalloy, an alloy of nickel and iron (NiFe). The thin-film NiFe layers are separated by nonmagnetic thin-film layers of $SiO_x$ which allow magnetostatic coupling between the layers, but inhibit exchange coupling that can increase the coercivity of the marker. Conventional electron beam (E-Beam) deposition processes are used to coat the thin-film layers of magnetic material on a flexible polymer substrate. The nonmagnetic thin-film layers of $SiO_x$ are grown by conventional sublimation deposition processes.

The thin-film layers of magnetic material are coated onto the substrate in the presence of a magnetic field which causes the magnetic film to form in such a manner that a desired axis of magnetization, known as the "easy" axis of magnetization, is developed in the film. When exposed to an alternating interrogation signal aligned with the easy axis of magnetization, the magnetic states of the thin-film layers are relatively easily driven to saturation, which induces the greatest response in the interrogation signal. In other words, the marker can be easily magnetized and will provide the greatest response in the interrogation signal when it is exposed to the interrogation signal with the easy axis of magnetization aligned with the interrogation signal. In contrast, when the interrogation signal is aligned with the "hard" axis of magnetization, an axis generally perpendicular to the easy axis, the layers become magnetized to only a relatively small value and induce little response to the interrogation signal.

The ability of magnetic-type EAS systems to detect marked articles is therefore dependent to some extent on the orientation of the markers as they are transported through the detection panels. EAS systems typically include interrogation systems that generate an interrogation signal along only one axis. Articles protected by systems of these types will produce the greatest response and be most easily detected when the marker attached to the article has its easy axis of magnetization oriented parallel to the interrogation signal axis as it passes through the detection panels. The magnitude of the induced response, and therefore the ability of the interrogation system to detect the presence of marked articles, decreases with increasing angle between the marker's easy axis of magnetization and the axis of the interrogation signal. The interrogation system's ability to detect the markers is lowest when the easy axis of magnetization is oriented perpendicular to the axis of the interrogation signal.

The Piotrowski et al. U.S. Patent discloses a dual axis or bi-directional magnetic marker which includes a plurality of magnetic thin-film NiFe layers separated by nonmagnetic thin-film $SiO_x$ layers. The dual-axis response is obtained by assembling two magnetic thin-films of the type described above so the easy axes of magnetization of the films are oriented at a perpendicular or 90° angle with respect to one another. Dual axis markers of this type offer considerable advantages over single axis markers since the interrogation system's ability to detect the markers is less sensitive to the orientation of the marker as it is transported through the detection panels. Unfortunately, current methods of manufacturing dual axis markers of this type are relatively complicated and add to the cost of the markers. Because the easy axis of magnetization of the thin-film elements aligns parallel to the axis of the magnetic field applied during deposition, the dual axis markers must be made either by laminating together two or more thin-film elements so their easy axes of magnetization are perpendicular to one another, or depositing the thin-film layers in a coating system capable of producing the orienting magnetic fields in two perpendicular directions. Again, these techniques are relatively complicated and add to the cost of the markers. There is, therefore, a continuing need for more efficient methods for manufacturing dual axis magnetic thin-film markers.

SUMMARY

The present invention is an improved method for manufacturing a thin-film magnetic device having an easy axis of magnetization which is perpendicular to the axis of a magnetic field applied during the deposition. This invention is based on the discovery and unexpected result that thin-film layers of magnetic material grown or deposited or a substrate in the presence of a magnetic field can be produced with an easy axis of magnetization which is perpendicular to the axis of the applied magnetic field if the layers are relatively thin.

One embodiment of the invention includes providing a substrate having a surface characterized by first and second generally perpendicular axes. A magnetic field oriented parallel to the first axis is applied to the surface of the substrate. A relatively thin thin-film layer of magnetic material is grown on the substrate in the presence of the magnetic field. The relatively thin layer is grown to a thickness sufficiently thick for the layer of material to exhibit magnetic properties that are substantially independent of surface effects, but sufficiently thin that the easy axis of magnetization is oriented parallel to the second axis. In a preferred embodiment, the method further includes growing a plurality of the relatively thin layers of magnetic material on the substrate in the presence of the magnetic field, and growing a thin-film layer of nonmagnetic material between each of the relatively thin layers of magnetic material.

The invention can also be used to manufacture a dual-axis magnetic marker of the type used in electronic article surveillance systems. The method includes providing a web of flexible substrate having a surface and characterized by generally perpendicular down-web and cross-web axes. Sources of magnetic and nonmagnetic material are provided at a deposition station. A magnet for applying a magnetic field oriented parallel to the cross-web axis of the substrate at the deposition station is also provided. The web is driven in a direction parallel to the down-web axis in alternating forward and reverse passes through the deposition station. A down-web aligned thin-film layer of magnetic material is deposited on the substrate in the presence of the magnetic field during each of a plurality of down-web aligned stack-forming forward and reverse passes through the deposition station. Each down-web aligned layer is deposited to a thickness sufficiently thick that the layer exhibits magnetic properties that are substantially independent of surface effects, yet sufficiently thin that the easy axis of magnetization of the material is oriented parallel to the down-web axis. A thin-film layer of nonmagnetic material is deposited between each down-web aligned layer during each of the plurality of down-web aligned stack-forming forward and reverse passes through the deposition station. A down-web aligned stack of relatively thin thin-film layers of magnetic material separated by layers of nonmagnetic material and having an easy axis of magnetization oriented parallel to the down-web axis is thereby formed. A cross-web aligned thin-film layer of magnetic material is deposited on the substrate in the presence of the magnetic field during each of a plurality of cross-web aligned stack-forming forward and reverse passes through the deposition chamber. Each cross-web aligned layer is deposited to a thickness sufficiently thick that the easy axis of the magnetization of the material is oriented parallel to the cross-web axis. A thin-film layer of nonmagnetic material is deposited between each cross-web aligned layer during each of the plurality of cross-web aligned stack-forming forward and reverse passes through the deposition station. A cross-web aligned stack of relatively thick thin-film layers of magnetic material separated by layers of nonmagnetic material and having an easy axis of magnetization oriented parallel to the cross-web axis is thereby formed. Magnetic marker sections are then separated from the web.

DETAILED DESCRIPTION OF THE PREFERRED EMBODIMENTS

The present invention is based on the unexpected discovery that thin-film layers of magnetic material grown or deposited on a substrate in the presence of a magnetic field can be produced with an easy axis of magnetization which is perpendicular to the axis of the applied magnetic field if the thin-film layers are relatively thin. For purposes of the present specification, the term "relatively thin" is defined to refer to a thin-film sufficiently thin such that the easy axis of magnetization aligns perpendicular to the axis of the applied magnetic field. As described below, for example, NiFe layers grown by electron beam evaporation to a thickness of about 200 angstroms in the presence of a 250–300 oersted (Oe) magnetic field have exhibited this characteristic. This thickness compares to thickness values greater than about 300 angstroms to which the NiFe thin-film layers are typically deposited to obtain an easy axis of magnetization which is aligned parallel to the axis of the applied magnetic field. Although specific examples for NiFe thin-films are described, each thin-film material will have different thicknesses at which it is sufficiently thin such that its easy axis is aligned perpendicular to the axis of the applied magnetic field. Any thin-film material and thickness thereof which satisfy the present "relatively thin" shall there/or be understood to fall within the spirit and scope of the present invention.

This discovery can be used to greatly increase the efficiency of thin-film magnetic device manufacturing processes since thin-films of this type having an easy axis of magnetization along either of two perpendicular axes can be produced with equipment configured to apply a magnetic field along only one of the axes.

Figure 1:
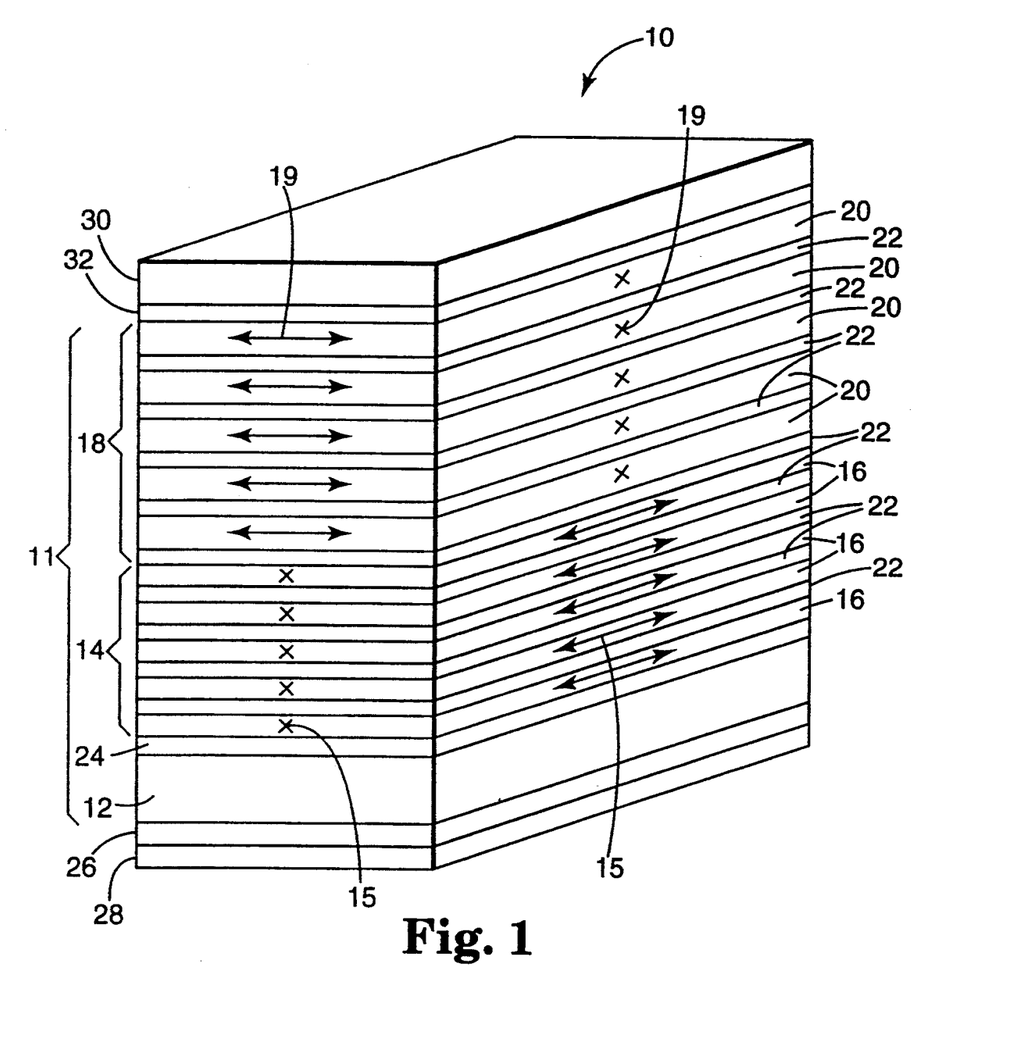
FIG. 1 is a perspective view (not to scale) of a laminated dual axis magnetic thin-film EAS marker manufactured in accordance with the present invention.

A dual axis, nonlinear response, thin-film magnetic electronic article surveillance (EAS) marker 10 manufactured in accordance with the present invention is illustrated generally in FIG. 1. Marker 10 includes a laminated thin-film magnetic device 11 which includes a substrate 12 which supports a down-web aligned (i.e., a second axis aligned) stack 14 of relatively thin thin-illin layers 16 of magnetic material, and a cross-web aligned (i.e., a first axis aligned) stack 18 of relatively thick thin-film layers 20 of magnetic material. Each relatively thin layer 16 and relatively thick layer 20 are separated by a thin-film layer 22 of nonmagnetic material. In the embodiment shown, an optional adhesion-promoting primer layer 24 overlays substrate 12 below down-web aligned stack 14. A pressure sensitive adhesive layer 26 overlays the surface of substrate 12 opposite stacks 14 and 16, and is used to securely mount marker 10 to a book or other article under surveillance. A release liner 28 protects the adhesive layer 26 until the marker is to be attached to an article to be protected. A protective layer 30 is secured to the upper surface of cross-web aligned stack 18 by pressure sensitive adhesive layer 32. Protective layer 30 can include a printable surface.

Substrate 12 is a thin and flexible polymeric member capable of withstanding the high temperatures present during the deposition of layers 16, 20 and 22. In one preferred embodiment, substrate 12, is an ICI Melinex thermally stabilized PET (polyethyleneterephthalate) material having a thickness of 50 $\mu$m. Other polymers such as polyimide can also be used for substrate 12, as can thin metallic foils of nonmagnetic stainless steel, aluminum or copper. An oxygen glow discharge can be used to form the adhesion-promoting primer layer 24. Polymeric substrates 12 ranging between 12 and 75 $\mu$m thick are typically used for markers 10.

Thin-film layers 16 and 20 are formed from magnetically soft materials characterized by low coercivity and high permeability. Materials with these characteristics are capable of producing the desired nonlinear magnetic response when exposed to an alternating interrogation signal. Prototypes markers 10 were produced with crystalline permalloy-type NiFe alloys. In one embodiment, the nominal composition of layers 16 and 20 is 81.5 weight % Ni and 18.5 weight % Fe. Other amorphous, polycrystalline, or crystalline ferromagnetic materials having these properties can also be used for layers 16 and 20.

As described below, thin-film layers 16 and 20 are deposited in the presence of an orienting magnetic field so these layers in stacks 14 and 18, respectively, have easy axes of magnetization which are perpendicular to one another. In FIG. 1, for example, the easy axis of magnetization of layers 16 in down-web aligned stack 14 are oriented parallel to a first or down-web axis represented by the "x"s and arrows 15. In this example, the easy axis of magnetization of layers 20 in cross-web aligned stack 18 are oriented parallel to a second or cross-web axis represented by the "x"s and arrows 19.

Nonmagnetic layers 22 can be formed from oxides of silicon or aluminum or other materials. SiO$_x$ was used as the material for layers 22 of prototype markers 10, where 'x' is approximately 1.

Figure 2:
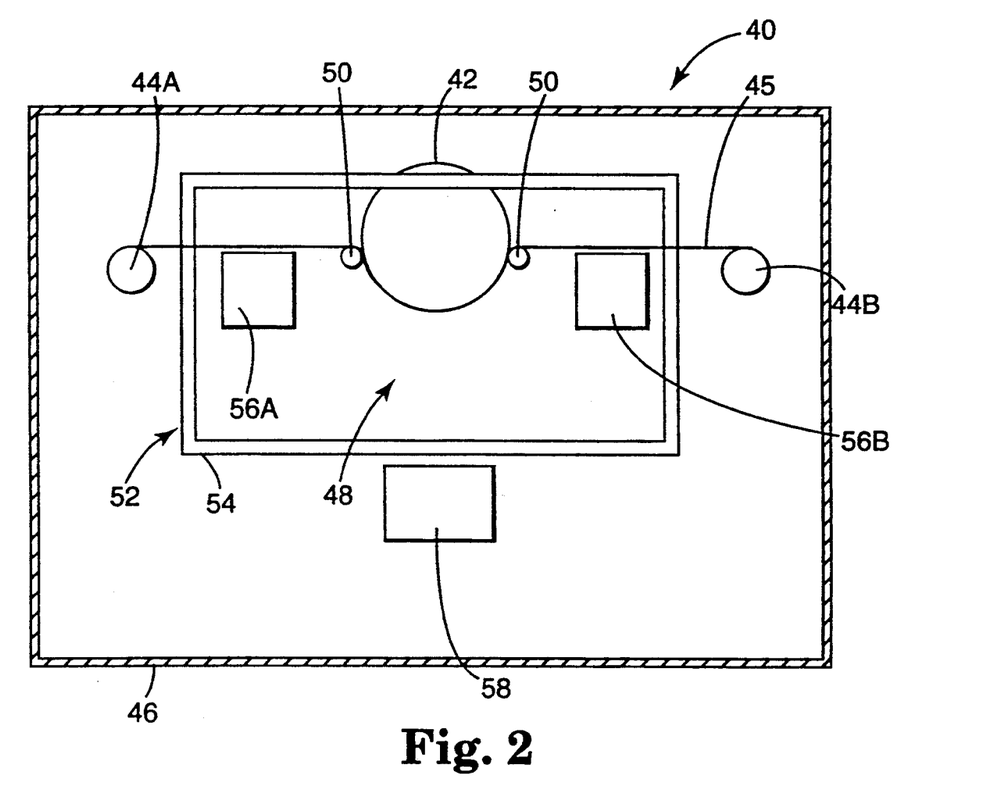
FIG. 2 is a side view of a coating system which can be used to manufacture magnetic thin-film devices in accordance with the present invention.

An exemplary thin-film coating system 40 which can be used to deposit magnetic thin-film layers 16 and 20 and nonmagnetic thin-film layers 22 onto substrate 12 can be described with reference to FIG. 2. It shall be understood that each magnetic and nonmagnetic thin film layer will herein be described as deposited on the substrate even though there may be one or more intervening layers of magnetic or non-magnetic material between the thin-film layer and the polymeric substrate 12. Coating system 40 includes a rotating heated drum 42 and a web drive system including a pair of take-up spools 44A and 44B, all of which are enclosed in a vacuum chamber 46. An elongated web 45 of substrate 12 is driven between take-up spools 44A and 44B in alternating forward and reverse passes through a ferromagnetic material deposition station 48. Web 45 is biased into engagement with drum 42 at deposition station 48 by rollers 50. Nonmagnetic material sources 56A and 56B are positioned below web 45 between deposition station 48 and take-up spools 44A and 44B, respectively. Conventional vacuum systems (not shown) are used to evacuate chamber 46. Although not shown in FIG. 2, take-up spools 44A and 44B and nonmagnetic material sources 56A and 56B can be positioned in separate vacuum chambers. In one embodiment the vacuum system includes a combination of turbomolecular and cryogenic pumps capable of evacuating chamber 46 to a base pressure of at least $5 \times 10^{-6}$ Torr. Coating system 40 is maintained at a pressure of about $5 \times 10^{-6}$ Torr during the coating manufacturing steps described below.

A Helmholtz coil 52 including a coil 54 on each side of web 45 (only one coil 54 is visible in FIG. 2) is also mounted within vacuum chamber 46. Helmholtz coil 52 generates an orienting magnetic field which is perpendicular to the longitudinal axis of the web 45 and parallel to the rotational axis of drum 42, i.e., is oriented in a "cross web" or "first web axis" direction. Helmholtz coil 52 is configured to generate an orienting magnetic field having a relatively constant magnitude across the width of the web 45. Coil 52 is positioned to locate the center of the orienting field at the intersection of drum 42 and web 45 in deposition station 48. The strength of the field generated by Helmholtz coil 52 is preferably sufficient to magnetically saturate and produce a high degree of anisotropy in the magnetic properties of the thin-film layers 16 and 20 being grown. Field strengths of 8,000–16,000 A/m (1 Oe=80 A/m) are generally sufficient for this purpose.

One or more electron beam evaporation systems 58 are mounted below web 45 at deposition station 48. Exemplary coating system 40 used to produce prototype magnetic devices 11 is configured to coat sixteen inch (40.6 cm) wide webs 45 of substrate 12, and includes two evaporation systems 58 (only one of which is visible in FIG. 2), each of which is positioned approximately four inches (10.2 cm) from the opposite edges of the web along the cross web axis. Each electron beam evaporation system 58 may include, for example, a three inch Edwards Temescal electron beam gun and a Temescal wire feed apparatus. The wire feed apparatus enables lengthy depositions with good compositional control. The power applied to the electron beam guns was varied to give the desired film deposition rates. Shutters and baffles (not shown) are also used in a conventional manner to obtain nearly normal incidence of the evaporant onto the web 45.

In the prototype coating system 40 described above, sources 56A and 56B include a crucible and inductive heater (not separately shown in FIG. 2) for depositing layers 22 of SiO$_x$ by a sublimation process. Commercially available silicon monoxide chips of approximately 6 mm in size can be used as the raw material. Sources 56A and 56B can be operated in a method similar to that described by Maisel and Clang in *Handbook of Thin Film Technology*, McGraw Hill, New York 1970, to thermally deposit the SiO$_x$ layers 22. The deposition rate is controlled by adjusting the temperatures of the deposition crucibles.

Coating system 40 is operated by driving the elongated web 45 of substrate 12 between take-up spools 44A and 44B in alternating forward and reverse passes through deposition station 48. During each pass, evaporation systems 58 and the nonmagnetic material sources 56A and 56B are operated to deposit half of a nonmagnetic thin-film layer 22, one magnetic thin-film layer 16 or 20, and half of a subsequent nonmagnetic thin-film layer 22, sequentially, on the lower side of the web. For example, during a one forward pass, web 45 is unwound from take-up spool 44A and wound onto spool 44B. Evaporation systems 58 and nonmagnetic material sources 56A and 56B are operated to deposit the second half of a first nonmagnetic thin-film layer 22, a first magnetic thin-film layer 16 and the first half of a second nonmagnetic thin-film layer 22, respectively, on the surface of the web during this pass. A reverse pass follows immediately afterward, with the web 45 being unwound from spool 44B and rewound onto spool 44A. Evaporation systems 58 and non magnetic material sources 56B and 56A are operated to deposit a second half of the second nonmagnetic thin-film layer 22, a second layer 16 and a first half of a third layer 22, respectively, on the layers deposited during the preceding pass. This procedure is repeated as often as required to produce the magnetic device 11 having a down-web aligned stack 14 and a cross-web aligned stack 18 including the desired number of relatively thin and relatively thick layers 16 and 20, respectively.

Prototype thin-film magnetic devices 11 were fabricated from a sixteen inch (40.6 cm) wide web 45 of Melinex thermally stabilized PET substrate 12. The web 45 was driven at a speed of about forty feet per minute (101.6 cm/min) with drum 42 heated to a temperature of about 80° C. Before depositing the first thin-film layer 16 or 20, the web 45 is degassed by driving the web through several passes near IR lamps (not shown) to remove any water adsorbed by the web. Other outgassing procedures, such as heating drum to about 300° C. and driving the web through several passes over the drum can also be used, depending on the properties of the substrate employed. It has been found that pre-heating of the web before the first pass with IR lamps and heated drum tends to inhibit cracking of the films. An oftenting magnetic field of about 250–300 oersteds was provided by Helmholtz coil 52. In addition to aligning the easy axes of magnetic layers 16 and 20 during deposition, the magnetic field produced by coil 52 helps position the electron beams produced by evaporation systems 58 to ensure that the beams properly impinge on the crucibles in the evaporation systems. No primer layer 24 was deposited on the prototype magnetic devices 11.

Relatively thin NiFe thin-film layers 16 of stack 14 which are grown in the manner and under the conditions described above to thicknesses in the range of 125–225 angstroms have easy axes of magnetization which are parallel to the down-web axis. This easy axis orientation is perpendicular to the cross-web axis of the orienting magnetic field applied during the growth of relatively thin thin-film layers 16. As the thickness of relatively thin thin-film layers 16 is decreased below 175 angstroms, surface effects exert increasing control over the magnetic characteristics of the layers and result in less desirable magnetic properties, including higher values of coercivity. As relatively thin NiFe layers 16 are grown to thicknesses beyond 225 angstroms, the extent to which the easy axis of magnetization of these layers is aligned with the down-web axis decreases. At thicknesses of about 300 or more angstroms, the easy axis of magnetization is substantially aligned with the cross-web axis of the orienting magnetic field.

Relatively thick thin-film layers 20 of stack 18 are therefore grown to a thickness of at least about 300 angstroms. The coercivity of relatively thick layers 20 increases with increasing thickness of the layers and effectively places limits on the thickness of the relatively thick layers. The thicknesses to which relatively thick and relatively thin layers 16 and 20 can be grown, yet still exhibit the desirable properties described herein, can vary and will depend on factors such as the nature and composition of the magnetic materials, the growth process parameters such as speed and temperature, and the strength of the orienting magnetic field applied during the coating process.

Following the growth of stacks 14 and 18 on web 45, the thin-film magnetic device 11 is removed from coating system 40. Sheets of adhesive layer 26 and release liner 28 are applied to the side of substrate 12 opposite stacks 14 and 18. In a similar manner, an adhesive layer 32 and protective layer 30 can be secured to the upper surface of stack 18 to complete a roll of marker stock. Individual markers 10 can then be cut, slit or otherwise separated from the roll of stock.

Figure 3:
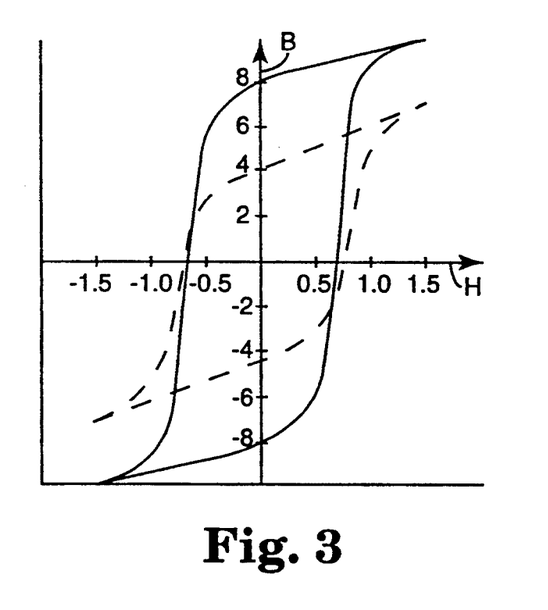
FIG. 3 is a graph of the measured B-H hysteresis loops about cross-web and down-web axes of a sample thin-film magnetic device manufactured in accordance with the present invention.

One embodiment of a thin-film magnetic device 11 was fabricated in the manner described above with a down-web aligned stack 14 having six about 200 angstrom thick relatively thin NiFe layers 16, and a cross-web aligned stack 18 having five about 350 angstrom thick relatively thick NiFe layers 20. A $SiO_x$ layer 22 having a thickness of about 125 angstroms separates each thin-film layer 16 and 20 in this device 11. One inch square (2.54 cm$^2$) samples of these devices 11 exhibit a down-web easy axis of magnetization, which is believed to originate from crystallographic or crystallite orientations within the relatively thin layers 16 of down-web aligned stack 14, even though these thin-film layers were deposited in the presence of the 250–300 oersted cross-web magnetic field. The easy axis of the relatively thick layers 20 of cross-web aligned stack 18 is oriented in the cross-web direction as expected. Markers 10 manufactured from this magnetic device 11 will therefore exhibit dual-axis magnetic characteristics. The number of thin-film magnetic layers in each stack 14 and 18, and the order in which these stacks are deposited on the substrate 12, can also be varied to meet specific requirements of the applications in which the film is to be used. For example, the interrogation signal response strength will be greater if the number of thin-film magnetic material layers is increased, but the cost of manufacturing will also be greater. FIG. 3 is a graph of the measured B-H hysteresis curves from the sample described above along both the down-web axis (shown by a broken line) and the cross-web axis (shown by a solid line).

Figure 4:
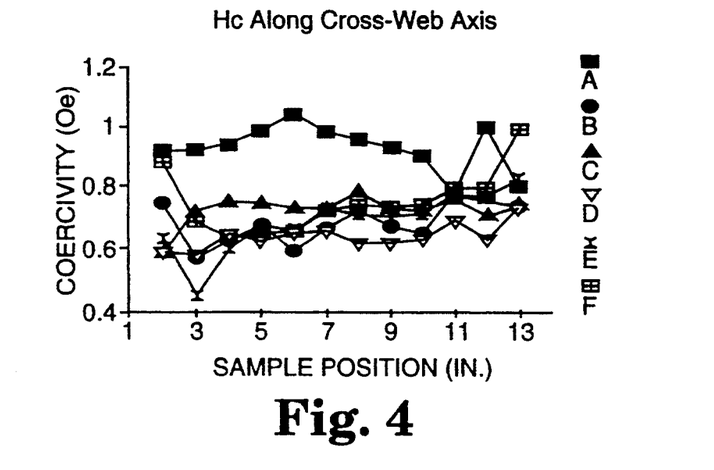
FIG. 4 is a graph of the measured coercive force along the cross-web axis at twelve spaced locations across the width of each of six samples from an elongated web of a thin-film magnetic device manufactured in accordance with the present invention.
Figure 5:
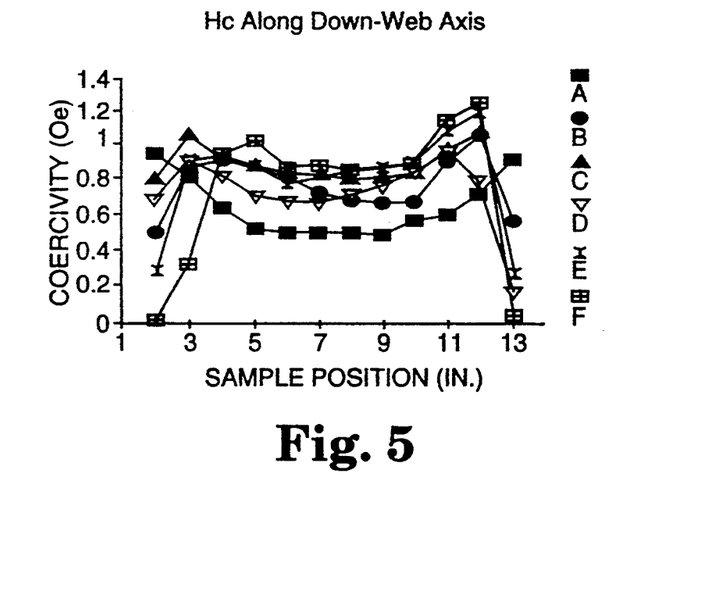
FIG. 5 is a graph of the measured coercive force along the down-web axis at twelve spaced locations across the width of each of six samples from an elongated web of a thin-film magnetic device manufactured in accordance with the present invention.

Measurements have shown that the coercive force, measured with magnetic fields applied along both the down-web and cross-web axes are relatively constant over a region of at least six to seven inches (15.2–17.8 cm) in the center of the sixteen inch web 45 from which the sample described above was taken. FIG. 4 is a graph of the cross-web coercivity (Hc) measured at twelve locations across the width of the web. Curves A-F were obtained at six down-web spaced positions on the web 45. The six samples A-F were made during different depositions over a period of about one week. Similarly, FIG. 5 is a graph of coercive force (Hc) along the down-web axis from the same samples. The measurements illustrated in FIGS. 4 and 5 were made on one inch square samples using an 18 KHz, 1.5 oersted applied magnetic field. The fact that sample A in FIGS. 4 and 5 deviates somewhat from the remainder of the samples can be explained by the fact that it was from the first deposition after pumpdown of the web 45 on which the deposition process started, and likely had residual water vapor that had not been driven out by the outgassing procedures. This phenomenon is commonly observed.

Figure 6:
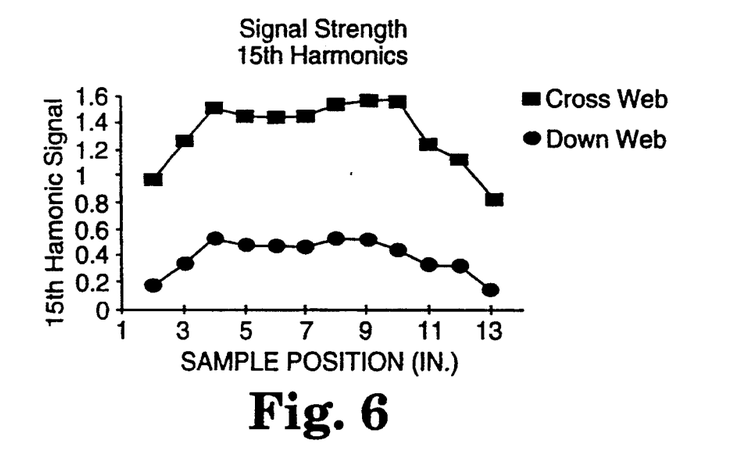
FIG. 6 is a graph of the measured 15th harmonic signal generated by prototype magnetic devices manufactured in accordance with the present invention when exposed to an interrogation signal oriented along the down-web and cross-web axes.

Measurements have also shown that the magnitudes of the responses produced in interrogation signals exposed to these six samples are relatively constant along both the down-web and cross-web axes for samples taken from a region within six to seven inches of the center of web 45. FIG. 6 is a graph of the 15th harmonic signal response generated in an 18 KHz, 1.5 Oe interrogation signal exposed to these samples when oriented along the down-web and cross-web axes of the samples. Each data point in FIG. 6 is an average of the six samples A-F at the given sample positions.

Figure 7:
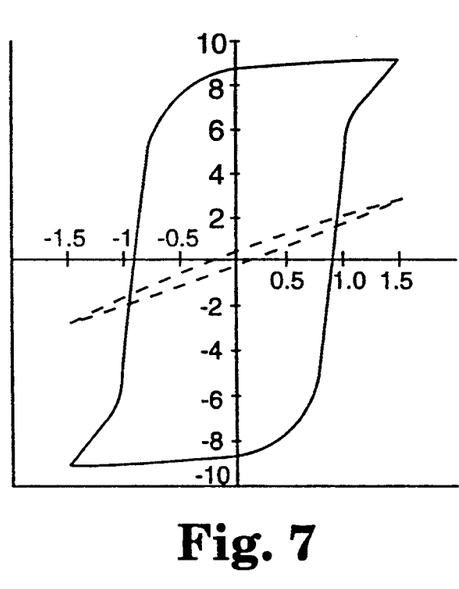
FIG. 7 is a graph of the measured B-H hysteresis loops along cross-web and down-web axes of a sample thin-film magnetic device manufactured in accordance with the present invention and including only a down-web aligned stack of relatively thin thin-film layers.

FIG. 7 is a graph of the B-H curve along both the down-web axis (shown by a solid line) and cross-web axis (shown by a broken line) of a sample of a thin-film magnetic device including six 200 angstrom thick thin-film layers 16 of NiFe separated by 125 angstrom thick layers 22 of $SiO_x$. The sample from which the measurements shown in FIG. 7 were taken was grown in the manner described above on a PET substrate 12, but had no relatively thick thin-film layers 20. The highly anisotropic properties of this sample, and its down-web easy axis of magnetization (even though grown in a 250–300 Oe cross-web magnetic field) are evident from this Figure.

The thin-film magnetic device and EAS marker manufacturing method described above offers considerable advantages over those of the prior art. In particular, the method enables the fabrication of a nonlinear, dual-axis device and marker without the need to laminate together two or more discreet films, or to rotate the magnetic field applied during film growth, to produce stacks of layers having perpendicular easy axes. These devices can be produced with the relatively high permeability and low coercive force necessary to generate strong responses in the interrogating fields to which the devices are exposed. High quality dual-axis magnetic thin-film devices and EAS markers can therefore be efficiently fabricated at lower cost.

Although the present invention has been described with reference to preferred embodiments, those skilled in the art will recognize that changes may be made in form and detail without departing from the spirit and scope of the invention. In particular, although the prototypes described above were manufactured with the down-web aligned stack on the substrate below the cross-web aligned stack, magnetic devices in accordance with the present invention could be fabricated with the stacks in the reverse order. The oftenting magnetic field could also be aligned with the down-web axis rather than the cross web axis as described above. Furthermore, the present invention can also be used to produce down-web aligned and cross-web aligned layers in a dual status (reversibly deactivatable) thin-film magnetic device.

What is claimed is:

1. A method for manufacturing a thin-film magnetic device, including:

providing a substrate having a surface characterized by first and second axes that are perpendicular to each other;

applying to the surface of the substrate a magnetic field oriented parallel to the first axis;

growing a relatively thin thin-film layer of magnetic material on the substrate in the presence of the magnetic field to a thickness sufficiently thick that the layer exhibits magnetic properties that are substantially independent of surface effects, but sufficiently thin that the easy axis of magnetization of the material is oriented parallel to the second axis.

2. The method of claim 1 and further including:

growing a plurality of the relatively thin thin-film layers of magnetic material in the presence of the magnetic field to form a first stack of the relatively thin layers; and growing each relatively thin layer to a thickness sufficiently thick that the first stack exhibits magnetic properties that are substantially independent of surface effects, yet sufficiently thin that the easy axis of magnetization is oriented parallel to the second axis; and growing a thin-film layer of nonmagnetic material between each of the relatively thin thin-film layers of the stack.

3. The method of claim 1 and further including:

growing a relatively thick thin-film layer of magnetic material on the substrate in the presence of the magnetic field to a thickness sufficiently thick that the easy axis of magnetization of the material is oriented parallel to the magnetic field; and growing a thin-film layer of nonmagnetic material between the relatively thick and relatively thin layers of magnetic material.

4. The method of claim 3 and further including:

growing a plurality of the relatively thin thin-film layers of magnetic material on the substrate in the presence of the magnetic field to form a first stack of the relatively thin layers, each relatively thin layer being grown to a thickness sufficiently thick that the first stack exhibits magnetic properties that are substantially independent of surface effects, yet sufficiently thin that the easy axis of magnetization is oriented parallel to the second axis;

growing a plurality of the relatively thick thin-film layers of magnetic material on the substrate in the presence of the magnetic field to form a second stack of the relatively thick layers, each relatively thick layer being grown to a thickness sufficiently thick that the axis of magnetization of the second stack is oriented parallel to the magnetic field; and growing a thin-film layer of nonmagnetic material between each of the relatively thick and relatively thin layers of magnetic material.

5. The method of claim 4 wherein providing the substrate includes providing a polymeric substrate.

6. The method of claim 5 wherein providing the polymeric substrate includes providing a PET substrate.

7. The method of claim 4 wherein growing the relatively thin and relatively thick layers of magnetic material includes growing layers of nickel and iron alloy.

8. The method of claim 7 wherein growing the relatively thin layers includes growing relatively thin layers of nickel and iron alloy to a thickness between about 125 angstroms and about 225 angstroms.

9. The method of claim 7 wherein growing the relatively thick layers includes growing relatively thick layers of nickel and iron alloy to a thickness greater than about 300 angstroms.

10. The method of claim 7 wherein applying the magnetic field to the surface of the substrate includes applying a magnetic field having a strength sufficiently great to magnetically saturate the relatively thick and relatively thin thin-film layers.

11. The method of claim 7 wherein applying the magnetic field on the surface of the substrate includes applying a magnetic field having a strength between about 200 oersteds and about 300 oersteds on the substrate.

12. The method of claim 4 wherein growing thin-film layers of nonmagnetic material includes growing layers of silicon oxide.

13. An electronic article surveillance marker including the magnetic thin-film device manufactured in accordance with claim 4.

14. A method for manufacturing a magnetic marker of the type used in an electronic article surveillance system, including:
providing a web of flexible substrate having a surface and characterized by first and second axes that are perpendicular to each other;
providing a deposition station including sources of magnetic and nonmagnetic materials;
driving the web in alternating forward and reverse passes through the deposition station;
providing a magnetic field source and applying to the surface of the substrate at the depostition station a magnetic field oriented parallel to the first axis;
depositing a second axis aligned thin-film layer of magnetic material on the substrate in the presence of the magnetic field during each of a plurality of second axis aligned stack-forming forward and reverse passes through the deposition station, each second axis aligned layer being deposited to a thickness sufficiently thick that the layer exhibits magnetic properties that are substantially independent of surface effects, yet sufficiently thin that the easy axis of magnetization of the material is oriented parallel to the second axis;
depositing a thin-film layer of nonmagnetic material between each second axis aligned layer during each of the plurality of second axis aligned stack-forming forward and reverse passes through the deposition station, to form a second axis aligned stack of relatively thin thin-film layers of magnetic material separated by layers of nonmagnetic material and having an easy axis of magnetization oriented parallel to the second axis;
depositing a first axis aligned thin-film layer of magnetic material on the substrate in the presence of the magnetic field during each of a purality of first axis aligned stack-forming forward and reverse passes through the deposition chamber, each first axis aligned layer being deposited to a thickness sufficiently thick that the easy axis of magnetization of the material is oriented parallel to the first axis;
depositing a thin-film layer of nonmagnetic material between each first axis aligned layer during each of the plurality of first axis aligned stack-forming forward and reverse passes through the deposition station, to form a first axis aligned stack of relatively thick thin-film layers of magnetic material separated by layers of nonmagnetic material and having an easy axis of magnetization oriented parallel to the first axis; and
separating, from the web, a magnetic marker section including the first axis aligned and second axis aligned stacks of magnetic thin-film layers.

15. The method of claim 14 wherein providing the web of flexible substrate includes providing a polymeric substrate.

16. The method of claim 15 wherein providing the polymeric substrate includes providing a PET substrate.

17. The method of claim 15 wherein growing relatively thin and relatively thick thin-film layers includes growing layers of nickel and iron alloy.

18. The method of claim 17 wherein growing the relatively thin thin-film layers includes growing relatively thin layers of nickel and iron alloy to a thickness between 125 angstroms and about 225 angstroms.

19. The method of claim 18 wherein applying the magnetic field to the surface of the web includes applying a magnetic field having the strength between about 200 oersteds and about 300 oersteds.

20. The method of claim 17 wherein growing the relatively thick layers includes growing relatively thick layers of nickel and iron alloy having a thickness greater than about 300 angstroms.

21. The method of claim 14 wherein growing a thin-film layers of nonmagnetic naterial includes growing layers of silicon oxide.

22. A method for manufacturing a thin-film magnetic device, including:
providing a substrate having a surface characterized by first and second axes that are perpendicular to each other;
applying to the surface of the substrate a magnetic field oriented parallel to the first axis;
growing a plurality of relatively thin thin-film layers of magnetic material to form a stack of the relatively thin layers;
growing each relatively thin layer to a thickness sufficiently thick that the stack exhibits magnetic properties that are substantially independent of surface effects, yet sufficiently thin that the easy axis of magnetization is oriented parallel to the second axis; and
growing a thin-film layer of nonmagnetic material between each of the relatively thin thin-film layers of magnetic material of the stack.

* * * * *

UNITED STATES PATENT AND TRADEMARK OFFICE
CERTIFICATE OF CORRECTION

PATENT NO.: 5,405,702

DATED: April 11, 1995

INVENTOR(S): Chester Piotrowski and Timothy M. Fell

It is certified that error appears in the above-identified patent and that said Letters Patent is hereby corrected as shown below:

On the Title Page under Section [54] delete "AND" and in col. 1, line 3,

On the Title Page under Section [57] Abstract, line 10 "thin-tim" should read --thin-film--

| | |
|---|---|
| Col. 4, line 52 | "there/or" should read --therefor-- |
| Col. 4, line 68 | "illin" should read --film-- |
| Col. 6, line 16 | "$5 \times 10^{-6}$" should read --$1 \times 10^{-5}$-- |
| Col. 9, line 59 | "oftenting" should read --orienting-- |
| Col. 12, line 37 | "naterial" should read --material-- |

Signed and Sealed this

Nineteenth Day of November, 1996

Attest:

BRUCE LEHMAN

Attesting Officer    Commissioner of Patents and Trademarks